United States Patent
Hefner et al.

(10) Patent No.: US 10,906,520 B2
(45) Date of Patent: Feb. 2, 2021

(54) AIRBAG TO SECURE PAYLOAD

(71) Applicant: Bell Helicopter Textron Inc., Fort Worth, TX (US)

(72) Inventors: Levi Charles Hefner, Arlington, TX (US); John Richard McCullough, Weatherford, TX (US)

(73) Assignee: Textron Innovations Inc., Providence, RI (US)

( * ) Notice: Subject to any disclaimer, the term of this patent is extended or adjusted under 35 U.S.C. 154(b) by 376 days.

(21) Appl. No.: 16/041,687

(22) Filed: Jul. 20, 2018

(65) Prior Publication Data

US 2020/0023829 A1    Jan. 23, 2020

(51) Int. Cl.

| | | |
|---|---|---|
| *B60V 3/08* | (2006.01) | |
| *B64C 27/08* | (2006.01) | |
| *B64B 1/62* | (2006.01) | |
| *B64D 9/00* | (2006.01) | |
| *B64C 39/04* | (2006.01) | |
| *B64C 3/30* | (2006.01) | |
| *B64C 1/34* | (2006.01) | |
| *B64C 39/02* | (2006.01) | |
| *B64C 37/00* | (2006.01) | |

(52) U.S. Cl.
CPC .............. *B60V 3/08* (2013.01); *B64B 1/62* (2013.01); *B64C 1/34* (2013.01); *B64C 3/30* (2013.01); *B64C 27/08* (2013.01); *B64C 37/00* (2013.01); *B64C 39/024* (2013.01); *B64C 39/04* (2013.01); *B64C 2201/027* (2013.01); *B64C 2201/042* (2013.01); *B64D 9/00* (2013.01)

(58) Field of Classification Search
CPC .. B60V 3/08; B64B 1/62; B64C 27/08; B64C 37/00; B64C 39/024; B64C 39/04; B64C 1/34; B64C 3/30; B64C 2201/027; B64C 2201/042; B64D 9/00
See application file for complete search history.

(56) References Cited

U.S. PATENT DOCUMENTS

| | | | | |
|---|---|---|---|---|
| 3,822,792 | A * | 7/1974 | Weingarten | B64D 9/00 414/676 |
| 4,544,319 | A * | 10/1985 | Folling | B64D 9/00 198/457.03 |
| 10,399,673 | B1 * | 9/2019 | Roop | B64C 3/30 |

(Continued)

*Primary Examiner* — Rodney A Bonnette
(74) *Attorney, Agent, or Firm* — Lightfoot & Alford PLLC

(57) ABSTRACT

Systems and methods include providing vertical takeoff and landing (VTOL) aircraft with a cargo pod having a selectively inflatable bladder system that firmly secures a payload disposed within the cargo pod when the bladder system is pressurized. The bladder system also controls the location, position, and/or orientation of the payload in order to adjust, control, and/or maintain the center of gravity of the aircraft during flight. The aircraft includes an impact protection system that further pressurizes the bladder system to protect the payload and/or that disperses a flame-retardant fluid into the cargo pod to protect electrical components of the aircraft. The aircraft is fully autonomous and self-directed via a preprogrammed location-based guidance system to allow for accurate delivery of the payload to its intended destination. The bladder system is depressurized in response to a landing event to allow for e f the payload from the cargo pod.

20 Claims, 5 Drawing Sheets

(56) References Cited

U.S. PATENT DOCUMENTS

| | | | |
|---|---|---|---|
| 2004/0016846 A1* | 1/2004 | Blackwell-Thompson | ................ B64G 1/14 244/118.1 |
| 2007/0007384 A1* | 1/2007 | Sliwa, Jr. | ................ F41H 11/00 244/30 |
| 2008/0315037 A1* | 12/2008 | Merz | ................ B64C 1/062 244/118.1 |
| 2018/0002016 A1* | 1/2018 | McCullough | ........... B64C 27/30 |

* cited by examiner

AIRBAG TO SECURE PAYLOAD

CROSS-REFERENCE TO RELATED APPLICATIONS

Not applicable

STATEMENT REGARDING FEDERALLY SPONSORED RESEARCH OR DEVELOPMENT

Not applicable.

BACKGROUND

Aircraft are generally used for high speed direct transport of passengers and/or cargo. Uneven loading of such passengers and/or cargo can affect the center of gravity of an aircraft, which may affect flight characteristics and performance of the aircraft. Rotorcraft have the distinct advantage of vertical takeoff and landing, hover, sideward, rearward, and forward flight, which allows for precise landing in space-restricted or otherwise obstructed landing zones in addition to precise maneuvering to and from such landing zones. However, such rotorcraft are especially sensitive to changes in their respective centers of gravity.

DETAILED DESCRIPTION

Figure 1:
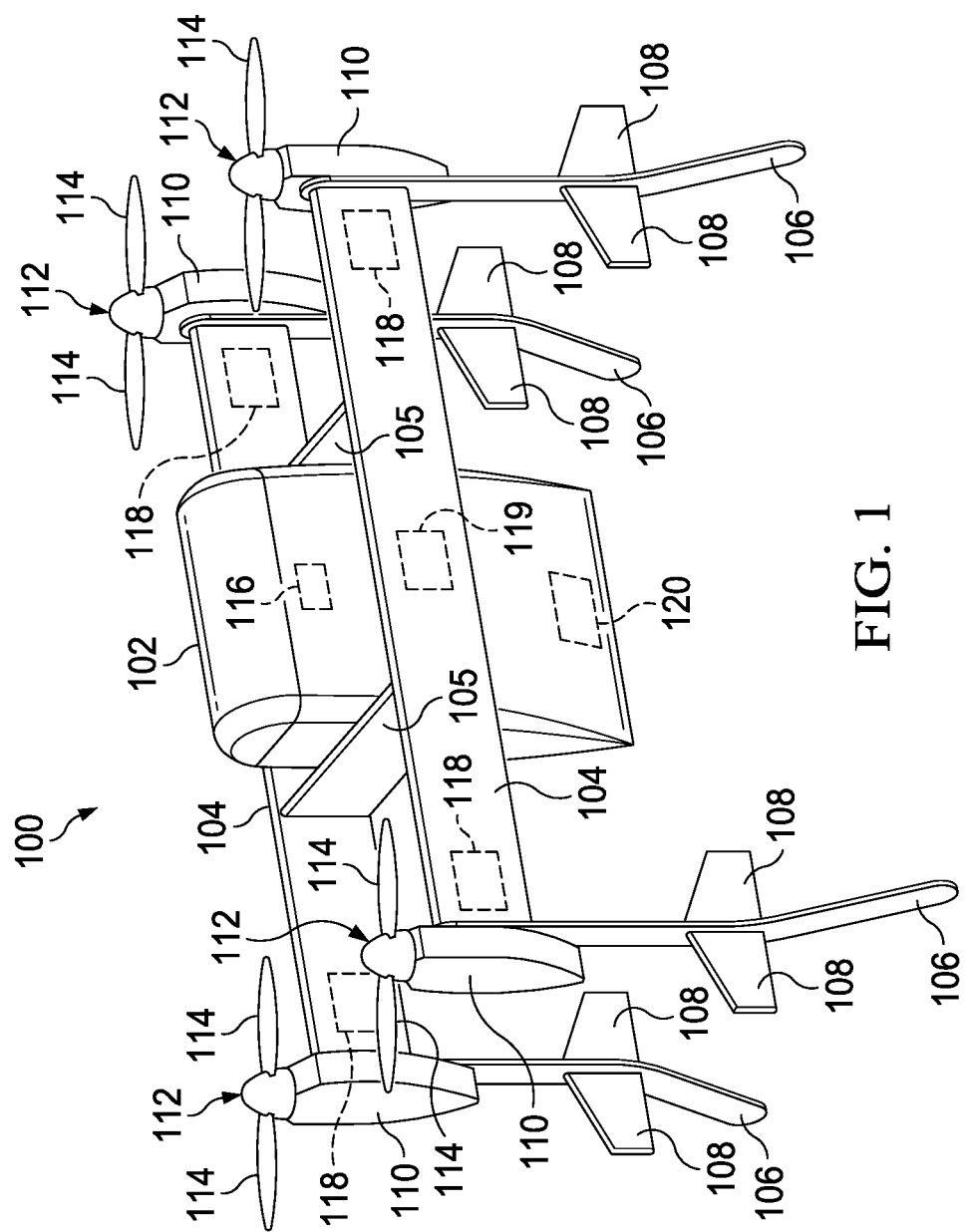
FIG. 1 is an oblique view of an aircraft configured for operation in a helicopter flight mode.

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Disclosed herein are embodiments of a vertical takeoff and landing (VTOL) aircraft that includes a cargo pod having a selectively inflatable bladder system disposed within the cargo pod. The cargo pod is configured to receive payloads of various shapes, sizes, and weights. Once a payload is received within the cargo pod, the bladder system, which may include one or more inflatable bladders, is selectively pressurized such that the one or more inflatable bladders make contact with various sides or features of the payload to secure the payload within the cargo pod. In embodiments of this disclosure, the inflatable bladders are inflated to a predetermined or preprogrammed pressure based on the characteristics (e.g., shape, size, weight, etc.) or nature (e.g., weight distribution) of the payload and/or to maintain a center of gravity of the aircraft. Further, in embodiments of this disclosure, the inflatable bladders are inflated in response to a closing of the cargo pod or other initializing event.

During operation and flight of the aircraft, which can include vertical takeoff and landing, hover, sideward, rearward, and forward flight, the center of gravity of the aircraft can change. The shift in the center of gravity is detected by one or more sensors and may be the result of the payload shifting, addition or removal of one or more payload components, a change in operation of the aircraft, and/or the use of fuel by the aircraft. The aircraft in this disclosure includes a control system that controls the bladder system in the cargo pod to selectively adjust the pressure within one or more of the inflatable bladders in response to the detected change in the center of gravity by the sensors to adjust the location, position, and/or orientation of the payload within the cargo pod, thereby effectively controlling the center of gravity of the aircraft after loading of the payload and during transit of the payload to its intended destination.

Accordingly, this disclosure contemplates a vertical takeoff and landing (VTOL) aircraft comprising a cargo pod having a selectively inflatable bladder system configured to control the location, position, and/or orientation of the payload within the cargo pod in order to adjust, control, and/or maintain the center of gravity of the aircraft during flight. Other aspects of this disclosure include providing the bladder system with a failsafe feature for impact protection. As such, in embodiments of this disclosure, the control system controls the pressure of the one or more inflatable bladders in anticipation of an impact or in response to an impact. Further, in embodiments of this disclosure, in anticipation of an impact or in response to an impact, the control system selectively disperses a flame-retardant material (e.g., foam) into the cargo pod to isolate one or more electrical components (e.g., battery) in order to prevent a fire from starting or spreading beyond the battery. In this manner, the flame-retardant material protects the rest of the aircraft as well as the surrounding area at the impact site. This can be accomplished via selective activation of an onboard compressor, pump, or auxiliary storage tank.

Still further, in embodiments of this disclosure, the aircraft is fully autonomous and self-directed via a predetermined or preprogrammed location-based guidance system (e.g., global positioning system (GPS), coordinate-based location, street address, etc.) to allow for accurate delivery of the payload to its intended destination. Once the aircraft has reached its intended destination, the control system depressurizes the bladders in response to a landing event, which may be the landing of the aircraft, unlocking or unlatching of the cargo pod, entry of a predetermined code into a keypad associated with the cargo pod, and/or opening of the cargo pod, to allow for selective removal of the payload.

Figure 2:
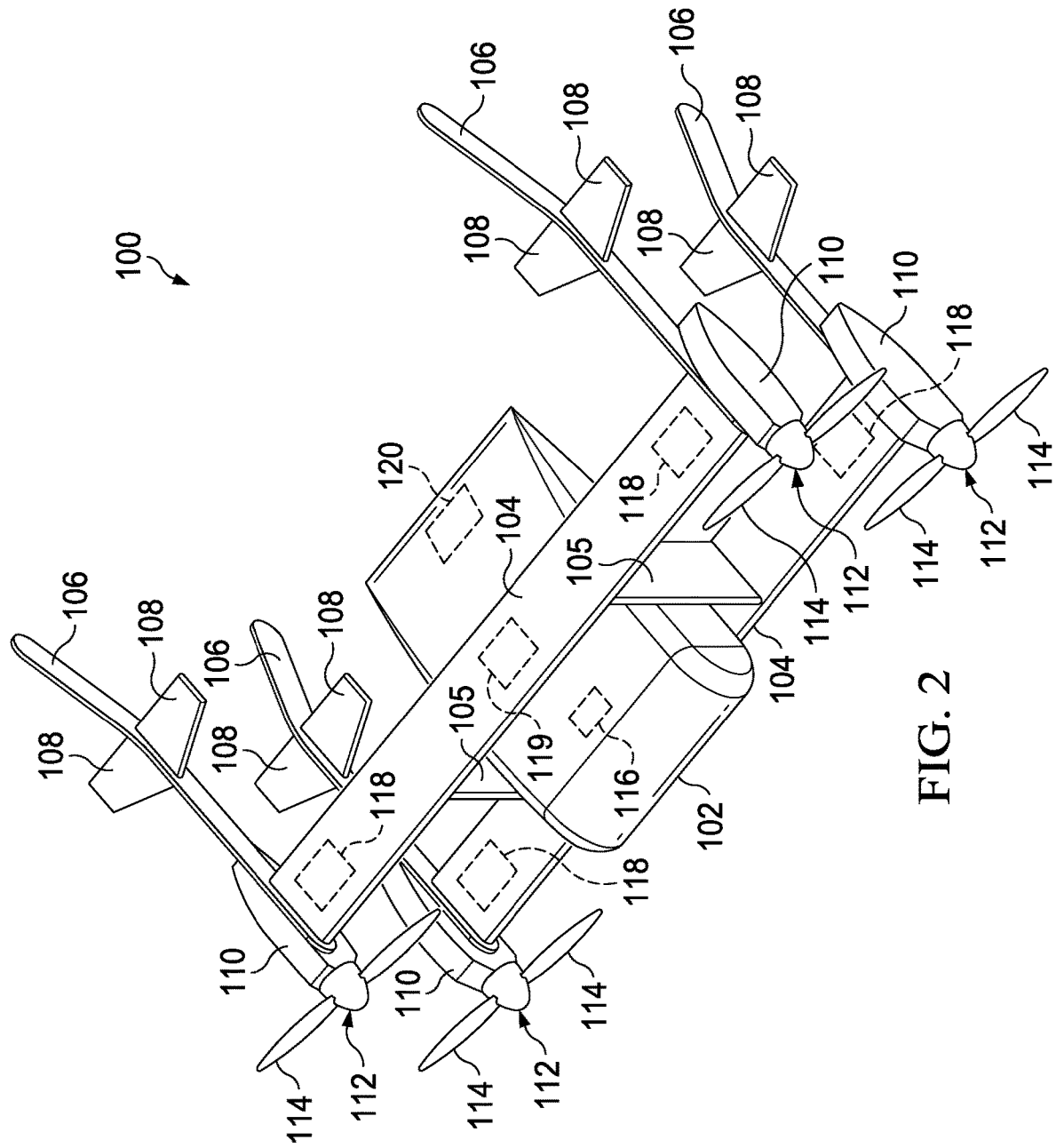
FIG. 2 is an oblique view of the aircraft of FIG. 1 configured for operation in an airplane flight mode.

Referring now to FIGS. 1 and 2, oblique views of an aircraft 100 are shown according to this disclosure. Aircraft 100 is generally configured as a vertical takeoff and landing (VTOL) aircraft, more specifically an autonomous pod transport (APT) convertible drone aircraft, that is operable in a helicopter mode (shown in FIG. 1) associated with vertical takeoff from and landing to a landing zone, hover, and sideward and rearward mobility or flight, and an airplane mode (shown in FIG. 2) associated with forward flight. Additionally, since aircraft 100 is a convertible aircraft, it is also operable in a conversion mode when transitioning between the helicopter and airplane modes. Further, being a drone-type aircraft, aircraft 100 is configured for remote control and operation. Additionally, at least in some embodiments, aircraft 100 may be fully autonomous and self-directed via a predetermined or preprogrammed location-based guidance system (e.g., global positioning system (GPS), coordinate-based location, street address, etc.).

Aircraft 100 comprises a cargo pod 102 that functions as the fuselage, biplane wings 104, vertical supports 105 disposed between the wings 104, tail booms 106, horizontal stabilizers 108 extending from each tail boom 106, and a plurality of pylons 110 each comprising a rotor system 112 having a plurality of rotor blades 114. Aircraft 100 also comprises a payload sensor 116, a plurality of aircraft sensors 118, an orientation sensor 119, and a control system 120. Wings 104 comprise a substantially parallel, double-wing configuration that provides lift to the aircraft 100 during forward flight while also maintaining a smaller footprint of the aircraft 100 when the aircraft 100 is on the ground. Vertical supports 105 are disposed on each side of the cargo pod 102 and affixed between the wings 104 to provide structure and support to the wings 104. The cargo pod 102 is generally positioned between the wings 104 and the vertical supports 105. In the embodiment shown, the cargo pod 102 is affixed to the vertical supports 105. However, in other embodiments, the cargo pod 102 may be affixed to the wings 104 or both the wings 104 and vertical supports 105. Additionally, while two vertical supports 105 are shown, in some embodiments, aircraft 100 may comprise more vertical supports 105 depending on the configuration of the aircraft 100.

Tail booms 106 are disposed on the outboard ends of each wing 104. The tail booms 106 are curved at the aft ends to provide stabilization to the aircraft 100 during forward flight in a manner substantially similar as other tail surfaces known in the art, while also doubling as a landing gear for the aircraft 100. As such the curved ends of the tail booms 106 provide a wider base for the landing gear. Each tail boom 106 also comprises a pair of horizontal stabilizers 108 coupled to each of an inner and outer surface of the tail boom 106. The horizontal stabilizers 108 function to provide stabilization to the aircraft 100 during forward flight in a manner substantially similar as horizontal stabilizers known in the art. Pylons 110 are disposed on outboard sides of each tail boom 106 proximate the outboard end of each wing 104. Each pylon 110 comprises a selectively rotatable rotor system 112 having a plurality of rotor blades 114 coupled thereto. In the embodiment shown, each rotor system 112 is driven by an associated electric motor. However, in other embodiments, the rotor systems 112 may be driven by a combustion engines or auxiliary power unit through a plurality of interconnect driveshafts and/or auxiliary gearboxes. Furthermore, since aircraft 100 functions as a convertible aircraft, the rotational speeds of each rotor system 112 may be selectively controlled to orient aircraft 100 in the various flight modes.

Figure 3:
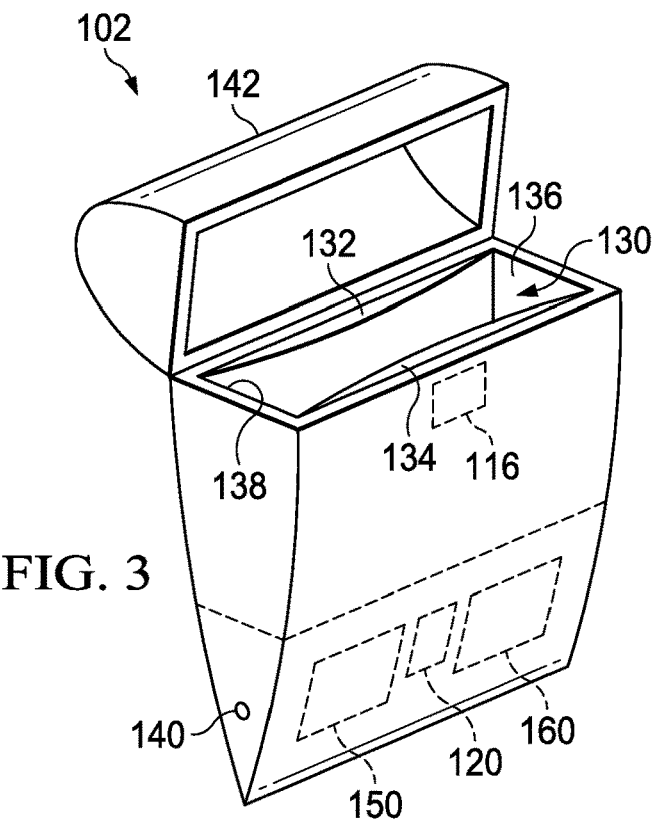
FIG. 3 is an oblique view of a cargo pod in an unpressurized state.
Figure 4:
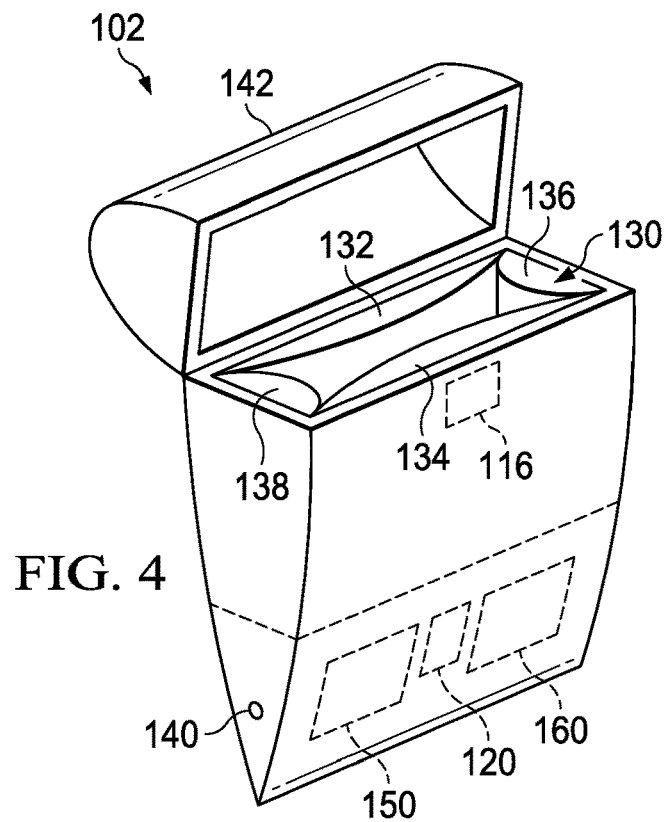
FIG. 4 is an oblique view of a cargo pod in a pressurized state.

Referring to FIGS. 3 and 4, oblique views of the cargo pod 102 of aircraft 100 are shown in an unpressurized state and a pressurized state, respectively. Cargo pod 102 generally comprises a low drag, aerodynamic profile. More specifically, in the embodiment shown, cargo pod 102 comprises a symmetric profile. However, in other embodiments, cargo pod 102 may comprise a cambered airfoil in order to provide additional lift to aircraft 100. The cargo pod 102 is generally configured to receive a payload within an interior of the cargo pod 102. In the embodiment shown, cargo pod 102 comprises a rectangular-shaped interior opening through which the payload is received. However, in other embodiments, cargo pod 102 may comprise a circular, square, triangular, or other shaped interior opening through which the payload is received. The cargo pod 102 comprises a stiff outer structure configured to retain its aerodynamic profile during flight of aircraft 100 and when a payload is inserted into the cargo pod 102. Furthermore, while only one cargo pod 102 is shown, aircraft 100 may comprise multiple cargo pods 102.

A bladder system 130 is disposed within the cargo pod 102. In the embodiment shown, bladder system 130 comprises a plurality of selectively inflatable bladders 132, 134, 136, 138 formed from an elastomeric material, nylon-woven fabric, Kevlar, or other material that allows for pressurization of the interior volume of each bladder. Each bladder 132, 134, 136, 138 is disposed adjacent a wall of the interior of the cargo pod 102. However, in other embodiments, bladder system 130 may comprise a single bladder (e.g. only bladder 132 or bladder 134), only opposing bladders (e.g., bladders 132, 134 or bladders 136, 138), or additional bladders disposed over the interior opening of the cargo pod 102 and in the bottom of the cargo pod 102. Further, in alternative embodiments, bladders 132, 134, 136, 138 may be coupled together to form a single ring-shaped bladder. In yet other alternative embodiments, bladders 132, 134, 136, 138 may be coupled together in fluid communication through a plurality of air plenums or channels. Additionally, in some embodiments, one or more bladders 132, 134, 136, 138 may be attached to an interior wall of the cargo pod 102.

As shown in FIG. 3, the bladders 132, 134, 136, 138 are unpressurized, and the cargo pod 102 is ready to receive a payload between the bladders 132, 134, 136, 138. The cargo pod 102 may receive payloads of various shapes, sizes, and weights. However, in some embodiments, depending on the size and configuration of aircraft 100, the payload may be weight-restricted to a predetermined weight. Once a payload is inserted into the cargo pod 102 and disposed between the bladders 132, 134, 136, 138, the bladders 132, 134, 136, 138 may be selectively inflated and pressurized. As shown in FIG. 4, the bladders 132, 134, 136, 138 have been pressurized to secure a payload. However, for clarity, the payload is not shown.

When pressurized, the bladders 132, 134, 136, 138 contact the payload to firmly secure the payload within the cargo pod 102. In some embodiments, the initial pressurization of the bladders 132, 134, 136, 138 may be predetermined or preprogrammed within control system 120 based on the characteristics (e.g., shape, size, weight, etc.) or nature (e.g., weight distribution) of the payload and/or to maintain a center of gravity of aircraft 100. However, in some embodiments, payload sensor 116 may comprise a radio-frequency identification (RFID) sensor or QR code reader that automatically identities an RFID tag or QR code, respectively, associated with the payload that assigns a preprogrammed initial pressurization to the bladders 132, 134, 136, 138. Further, to prevent overpressurization of the bladders 132, 134, 136, 138, bladder system 130 comprises a pressure relief valve 140. After the payload has been secured within the cargo pod 102, cover 142 of the cargo pod 102 can be dosed and secured via a latching, locking or other electromechanical or mechanical securing mechanism. At this point, aircraft 100 is ready to transport the payload in flight.

During transport of the payload in flight, the payload may experience forces, vibrations, or other phenomena that may cause the payload to shift within the cargo pod 102. Shifting of the payload within the cargo pod 102 may alter the center of gravity of aircraft 100, which may negatively affect flight and/or performance of the aircraft 100. In some embodiments, a shift in the payload and/or a shift in the center of gravity of the payload can be detected by the payload sensor 116. In some embodiments, the shift in the center of gravity of aircraft 100 may be detected by the plurality of aircraft sensors 118, which may be configured to monitor the power and/or torque of each rotor system 112, and the orientation sensor 119. By comparing an orientation of aircraft 100 detected by the orientation sensor 119 to the power and/or torque of each rotor system 112, the center of gravity of aircraft 100 may be determined. Accordingly, the shift in the center of gravity of aircraft 100 can be detected, for example, when the power and/or torque of the rotor systems 112 monitored by aircraft sensors 118 remains the same, but the orientation of the aircraft 100 monitored by the orientation sensor 119 changes. Further, the shift in the center of gravity of aircraft 100 can also be detected when the power and/or torque requirements of the rotor systems changes in order to maintain a desired orientation of the aircraft 100.

The power and/or torque of each rotor system 112 monitored by the aircraft sensors 118, the orientation of the aircraft 100 monitored by the orientation sensor 119, and/or the detected shift in payload and/or the shift in the center of gravity of aircraft 100 are communicated to control system 120. As such, control system 120 can selectively control the pressure of one or more of the bladders 132, 134, 136, 138 of bladder system 130 to adjust the location, position, and/or orientation of the payload within the cargo pod 102 in order to change, maintain, or restore the center of gravity of the aircraft 100 to a desired position while the aircraft 100 is in flight and without modifying the payload or changing the contents of the payload. The pressure within the bladders 132, 134, 136, 138 can be continuously controlled and repeatedly adjusted to maintain a desired center of gravity of aircraft 100. However, in some embodiments, the pressure within the bladders 132, 134, 136, 138 can be maintained until a shift in the payload or shift in the center of gravity of aircraft 100 is detected.

While control system 120 is configured to maintain a desired center of gravity of aircraft 100 by selectively adjusting the pressure within the bladders 132, 134, 136, 138 in response to feedback from one or more of the payload sensor 116, aircraft sensors 118, and/or orientation sensor 119, control system 120 may also be configured to increase pressure within the bladders 132, 134, 136, 138 in response to an impact and/or anticipation of impact in order to protect the payload. Anticipation of an impact may be prompted by a drastic change in altitude or any abnormal flight characteristics not matching inputs from a remote pilot or a flight control system, which may for example, be control system 120. Alternatively or additionally, cargo pod 102 may also comprise an impact protection system 150 carried in a lower portion of cargo pod 102. Impact protection system 150 may be controlled by control system 120 and generally comprises a failsafe which may disperse a flame-retardant material (e.g., foam) upon impact to isolate electrical components of the aircraft 100, such as batteries 160, that are configured to power the electric motors of the rotor systems 112. In this manner, the flame-retardant material prevents a fire from starting or spreading beyond the batteries 160 and protects the rest of the aircraft 100 as well as the surrounding area at the impact site. Impact protection system 150 may also comprise an onboard compressor or pump and/or auxiliary storage tank containing compressed air, carbon dioxide, or nitrogen for rapid inflation of the bladders 132, 134, 136, 138 upon impact.

Furthermore, in some embodiments, aircraft 100 may be controlled remotely to reach an intended destination. However, in some embodiments, aircraft 100 may be fully autonomous and self-directed via a predetermined or pre-programmed location-based guidance system (e.g., global positioning system (GPS), coordinate-based location, street address, etc.) to allow for accurate delivery of the payload to its intended destination. A destination may be input to the control system 120 by a remote pilot or may be received into the control system 120 through the payload sensor 116 reading or detecting a shipping label, QR code, RFID tag, or other identifying feature associated with the payload that associates a predetermined destination with the payload. Once the aircraft has reached its intended destination, the control system 120 depressurizes one or more of the bladders 132, 134, 136, 138 in response to a landing event. The landing event may comprise landing of the aircraft 100, unlocking or unlatching of the cover 142 of the cargo pod 102, entry of predetermined code into a keypad or touchscreen associated with the cargo pod 102 or the control system 120, and/or opening the cover 142 of the cargo pod 102, to allow for selective removal of the payload by the intended recipient. Thereafter, the aircraft 100 may be preprogrammed to return to its origin or to an alternative destination.

While the embodiments shown depict aircraft 100 that is an autonomous pod transport (APT) convertible drone aircraft, it will be appreciated that cargo pod 102 and bladder system 130 may be used in any other aircraft and/or rotorcraft to facilitate faster loading of a payload by automatically adjusting the center of gravity, to provide on-the-fly shifting of the center of gravity of the payload within the cargo pod 102, and/or to adjust the center of gravity of the aircraft as a whole. The cargo pod 102 may be affixed to an exterior of the aircraft, or alternatively, be affixed to an interior of an aircraft component, such as a fuselage. This is applicable to both "manned" and "un-manned" aircraft. Further, in some embodiments, it will be appreciated that cargo pod 102 and the associated bladder system 130 may be retrofit with existing manned or unmanned aircraft and/or rotorcraft.

Figure 5:
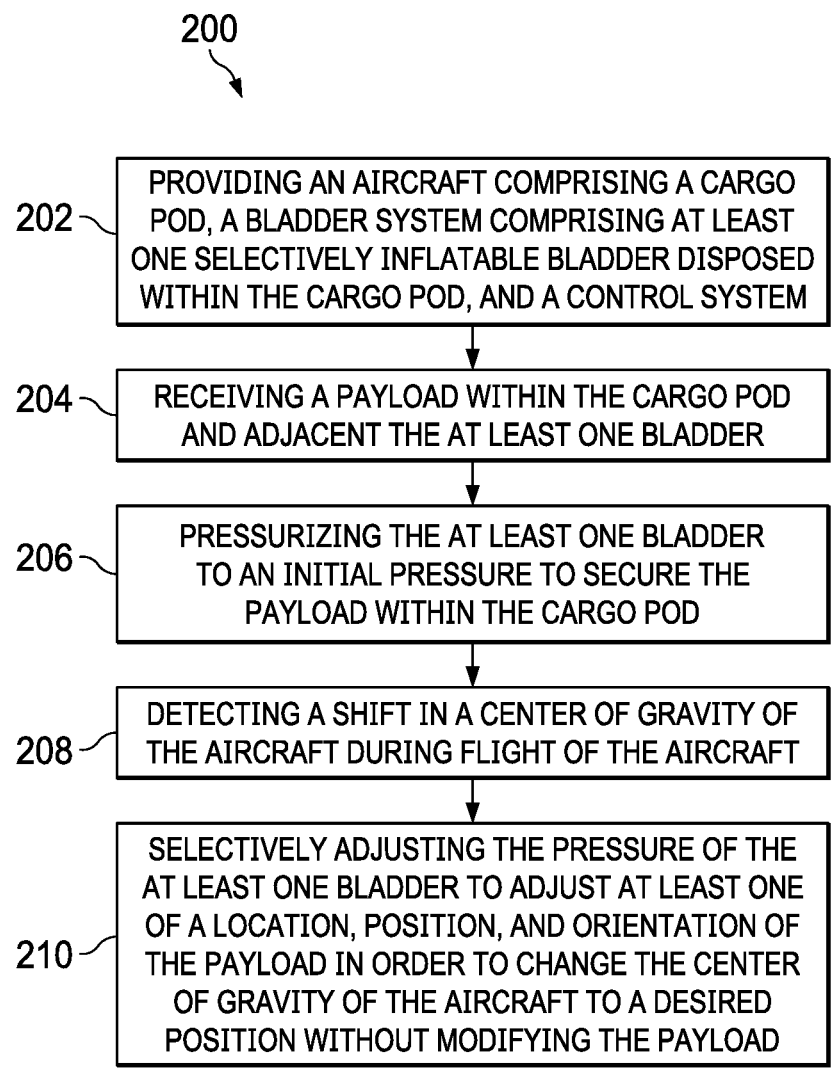
FIG. 5 is a flowchart of a method of securing a payload in an aircraft.

Referring to FIG. 5, a flowchart of a method 200 of securing a payload in an aircraft 100 is shown. Method 200 begins at block 202 by providing an aircraft 100 comprising a cargo pod 102 comprising an aerodynamic profile and functioning as a fuselage, a bladder system 130 comprising at least one selectively inflatable bladder 132, 134, 136, 138 disposed within the cargo pod 102, and a control system 120 comprising at least one sensor. Method 200 continues at block 204 by receiving a payload within the cargo pod 102 and adjacent the at least one bladder 132, 134, 136, 138. Method 200 continues at block 206 by pressurizing the at least one bladder 132, 134, 136, 138 to an initial pressure to secure the payload within the cargo pod 102. In some embodiments, the initial pressure is selected in response to a characteristic of the payload. Method 200 continues at block 208 by detecting a shift in the center of gravity of the aircraft 100 during flight. Method 200 continues at block 210 by selectively adjusting the pressure of the at least one bladder 132, 134, 136, 138 to adjust at least one of a location, position, and orientation of the payload in order to restore the center of gravity of the aircraft 100 to a desired position. Additionally, method 200 may also comprise the steps of self-directing the aircraft 100 to a preprogrammed destination via a location-based guidance system and/or depressurizing the at least one bladder 132, 134, 136, 138 in response to a landing event.

Figure 6:
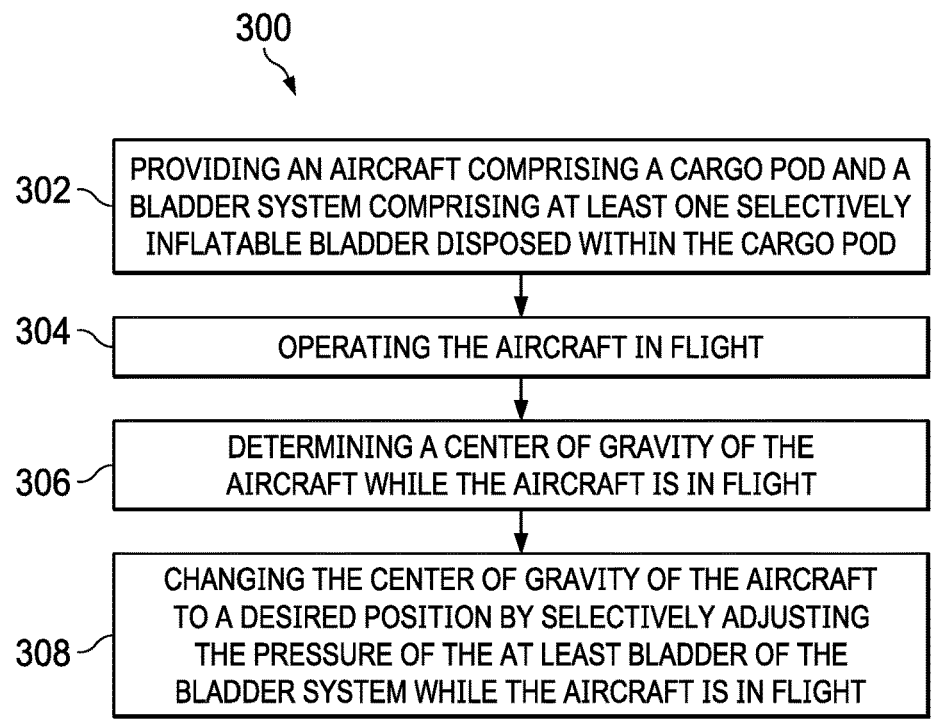
FIG. 6 is a flowchart of a method of operating an aircraft.

Referring to FIG. 6, a flowchart of a method 300 of operating an aircraft 100 is shown. Method 300 begins at block 302 by providing an aircraft 100 comprising a cargo pod 102 and a bladder system 130 comprising at least one selectively inflatable bladder 132, 134, 136, 138 disposed within the cargo pod 102. Method 300 continues at block 304 by operating the aircraft 100 in flight. Method 300 continues at block 306 by determining a center of gravity of the aircraft 100 while the aircraft 100 is in flight. In some embodiments, the center of gravity of aircraft 100 is determined in response to a power or torque requirement of a plurality of rotor systems 112 associated with the aircraft 100 and an orientation of the aircraft 100. As such, the power or torque requirement of each rotor system 112 is monitored by an associated aircraft sensor, and wherein the orientation of the aircraft 100 is monitored by an orientation sensor 119. Method 300 concludes at block 308 by changing the center of gravity of the aircraft 100 to a desired position by selectively adjusting the pressure of the at least bladder 132, 134, 136, 138 of the bladder system 130 while the aircraft 100 is in flight.

Figure 7:
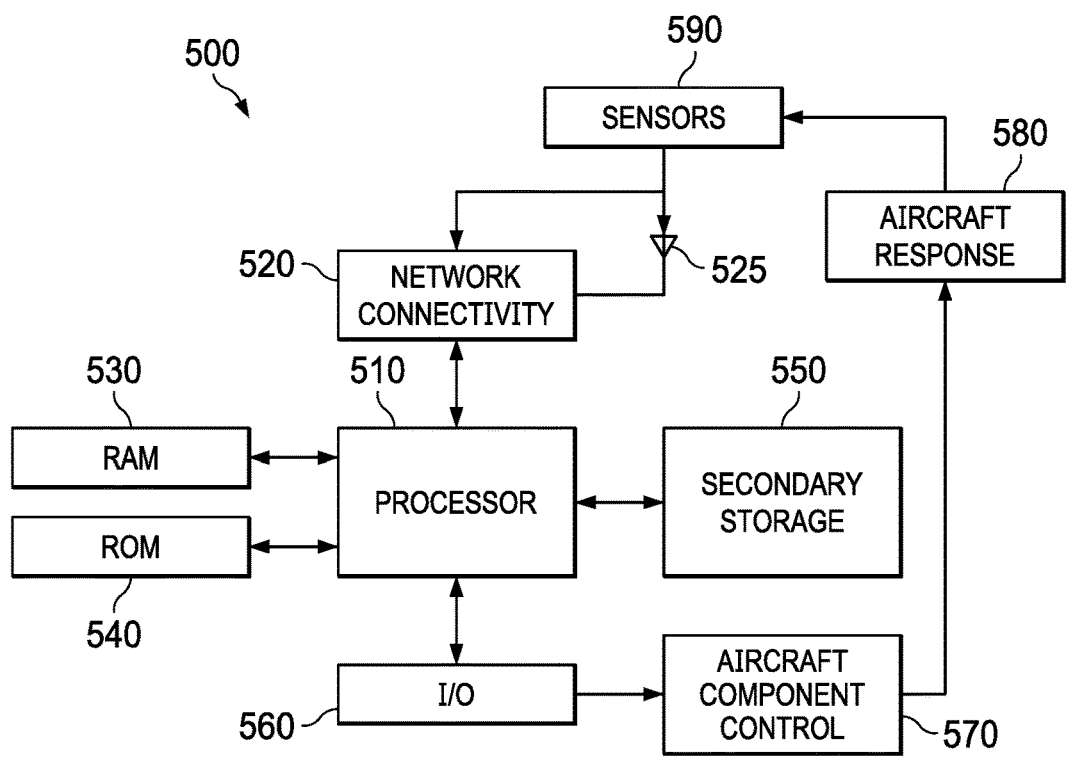
FIG. 7 is a schematic diagram of a general-purpose processor (e.g. electronic controller or computer) system suitable for implementing the embodiments of this disclosure.

Referring to FIG. 7, a schematic diagram of a general-purpose processor (e.g. electronic controller or computer) system 500 suitable for implementing the embodiments of this disclosure is shown. System 500 that includes a processing component 510 suitable for implementing one or more embodiments disclosed herein. In particular, control system 120 of aircraft 100 configured to control operation of the rotor systems 112, bladder system 130, and/or other electronic systems of aircraft 100 disclosed herein may comprise one or more systems 500. In addition to the processor 510 (which may be referred to as a central processor unit or CPU), the system 500 might include network connectivity devices 520, random access memory (RAM) 530, read only memory (ROM) 540, secondary storage 550, and input/output (I/O) devices 560. System 500 may also comprise aircraft component controls 570 (e.g., for bladder system 130), aircraft responses 580 (e.g., cyclic control, pitch attitude), and sensors 590 (e.g., sensors 116, 118, 119) In some cases, some of these components may not be present or may be combined in various combinations with one another or with other components not shown. These components might be located in a single physical entity or in more than one physical entity. Any actions described herein as being taken by the processor 510 might be taken by the processor 510 alone or by the processor 510 in conjunction with one or more components shown or not shown in the system 500. It will be appreciated that the data described herein can be stored in memory and/or in one or more databases.

The processor 510 executes instructions, codes, computer programs, or scripts that it might access from the network connectivity devices 520, RAM 530, ROM 540, or secondary storage 550 (which might include various disk-based systems such as hard disk, floppy disk, optical disk, or other drive). While only one processor 510 is shown, multiple processors may be present. Thus, while instructions may be discussed as being executed by processor 510, the instructions may be executed simultaneously, serially, or otherwise by one or multiple processors 510. The processor 510 may be implemented as one or more CPU chips and/or application specific integrated chips (ASICs).

The network connectivity devices 520 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 520 may enable the processor 510 to communicate with the Internet or one or more telecommunications networks or other networks from which the processor 510 might receive information or the processor 510 might output information.

The network connectivity devices 520 might also include one or more transceiver components 525 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 525 might include separate receiving and transmitting units or a single transceiver. Information transmitted or received by the transceiver 525 may include data that has been processed by the processor 510 or instructions that are to be executed by processor 510. Such information may be received from and outputted to a network in the form, for example, of a computer data baseband signal or signal embodied in a carrier wave. The data may be ordered according to different sequences as may be desirable for either processing or generating the data, transmitting or receiving the data, and/or controlling the aircraft 100 and/or bladder system 130. The baseband signal, the signal embedded in the carrier wave, or other types of signals currently used or hereafter developed may be referred to as the transmission medium and may be generated according to several methods well known to one skilled in the art.

The RAM 530 might be used to store volatile data and perhaps to store instructions that are executed by the processor 510. The ROM 540 is a non-volatile memory device that typically has a smaller memory capacity than the memory capacity of the secondary storage 550. ROM 540 might be used to store instructions and perhaps data that are read during execution of the instructions. Access to both RAM 530 and ROM 540 is typically faster than to secondary storage 550. The secondary storage 550 is typically comprised of one or more disk drives, tape drives, or solid state drives and might be used for non-volatile storage of data or as an over-flow data storage device if RAM 530 is not large enough to hold all working data. Secondary storage 550 may be used to store programs or instructions that are loaded into RAM 530 when such programs are selected for execution or information is needed.

The I/O devices 560 may include liquid crystal displays (LCDs), touchscreen displays, keyboards, keypads, switches, dials, mice, track balls, voice recognizers, card readers, paper tape readers, printers, video monitors, transducers, sensors 590 (e.g., sensors 116, 118, 119 of aircraft 100), motor drive electronics, or other well-known input or output devices, such a cyclic control, collective control, and pedal inputs used by a pilot, co-pilot, or remote pilot. Also, the transceiver 525 might be considered to be a component of the I/O devices 560 instead of or in addition to being a component of the network connectivity devices 520. Some or all of the I/O devices 560 may be substantially similar to various components disclosed herein and/or may be components of any of the control systems (e.g., control system 120 of aircraft 100) and/or other electronic systems disclosed herein. Further, inputs provided through an I/O device 560, such as control system 120, may communicate with aircraft component control 570, which may include control for the bladder system 130. Thus, control system 120 may provide control signals to the bladder system 130 to adjust, control, and/or maintain a center of gravity of a payload in the cargo pod 102 and/or the aircraft 100 as a whole during flight. Feedback via aircraft response 580 and/or sensors 590 (e.g., sensors 116, 118, 119, and/or other aircraft system sensors) may further communicate through one or more of the network connectivity devices 520 and/or one or more transceiver components 525 to provide feedback to control aircraft 100 and its associated systems.

At least one embodiment is disclosed, and variations, combinations, and/or modifications of the embodiments) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. An aircraft, comprising:
   a cargo pod;
   a bladder system comprising at least one selectively inflatable bladder disposed within the cargo pod; and
   a control system configured to selectively control a pressure of the at least one bladder to adjust at least one of a location, position, and orientation of a payload disposed within the cargo pod in order to change a center of gravity of the aircraft to a desired position while the aircraft is in flight and without modifying the payload.

2. The aircraft of claim 1, wherein the at least one bladder system comprises a single ring-shaped bladder.

3. The aircraft of claim 1, wherein the bladder system comprises a plurality of selectively inflatable bladders, each bladder being disposed adjacent to an inner wall within the cargo pod.

4. The aircraft of claim 1, wherein the at least one bladder contacts the payload to firmly secure the payload within the cargo pod when the at least one bladder is pressurized.

5. The aircraft of claim 4, wherein the control system is configured to initially pressurize the at least one bladder to a predetermined pressure.

6. The aircraft of claim 5, wherein at least one sensor comprises a radio-frequency identification (RFID) sensor that automatically identifies an RFID tag associated with the payload that assigns a preprogrammed initial pressurization to the at least one bladder.

7. The aircraft of claim 1, wherein a shift in the payload that results in a shift in the center of gravity of the aircraft is detected in response to a change in a power or torque requirement of a plurality of rotor systems associated with the aircraft in order to maintain a desired orientation of the aircraft.

8. The aircraft of claim 7, wherein the detected shift in the center of gravity of the aircraft is communicated to the control system.

9. The aircraft of claim 1, wherein the pressure within the at least one bladder is repeatedly adjusted to maintain a desired center gravity of the aircraft 100 during a single flight of the aircraft.

10. The aircraft of claim 1, wherein the control system is configured to adjust the pressure within the at least one bladder in response to at least one of an impact and an anticipation of impact in order to protect the payload.

11. The aircraft of claim 1, further comprising: an impact protection system configured to disperse a flame-retardant material into the cargo pod upon impact or in anticipation of an impact of the aircraft.

12. The aircraft of claim 1, wherein the aircraft comprises a convertible aircraft comprising biplane wings disposed on opposing sides of the cargo pod, tail booms disposed on outboard ends of each wing and functioning as landing gear, and a quad rotor system.

13. A method of securing a payload in an aircraft, comprising:
   providing an aircraft comprising a cargo pod, a bladder system comprising at least one selectively inflatable bladder disposed within the cargo pod, and a control system;
   receiving a payload within the cargo pod and adjacent the at least one bladder;
   pressurizing the at least one bladder to an initial pressure to secure the payload within the cargo pod;
   detecting a shift in a center of gravity of the aircraft during flight of the aircraft; and
   selectively adjusting the pressure of the at least one bladder to adjust at least one of a location, position, and orientation of the payload in order to change the center of gravity of the aircraft to a desired position without modifying the payload.

14. The method of claim 13, wherein the initial pressure is selected in response to a characteristic of the payload.

15. The method of claim 14, further comprising: changing the pressure of the at least one bladder in response to at least one of an impact and an anticipation of impact.

16. The method of claim 13, wherein the shift in the center of gravity of aircraft is detected in response to a change in a power or torque requirement of a plurality of rotor systems associated with the aircraft in order to maintain a desired orientation of the aircraft.

17. The method of claim 16, further comprising: selectively dispersing a flame-retardant material into the cargo pod in response to an impact or in anticipation of an impact of the aircraft.

18. A method of operating an aircraft, comprising:
   providing an aircraft comprising a cargo pod and a bladder system comprising at least one selectively inflatable bladder disposed within the cargo pod;
   operating the aircraft in flight;
   determining a center of gravity of the aircraft while the aircraft is in flight; and
   changing the center of gravity of the aircraft to a desired position by selectively adjusting the pressure of the at least bladder of the bladder system while the aircraft is in flight.

19. The method of claim 18, wherein the center of gravity of the aircraft is determined in response to a power or torque requirement of a plurality of rotor systems associated with the aircraft and an orientation of the aircraft.

20. The method of claim 19, wherein the power or torque requirement of each rotor system is monitored by an associated aircraft sensor, and wherein the orientation of the aircraft is monitored by an orientation sensor.

* * * * *